United States Patent
Martin et al.

(10) Patent No.: US 7,689,357 B2
(45) Date of Patent: Mar. 30, 2010

(54) CLOSED LOOP HYBRIDISING DEVICE WITH MONITORING OF THE MEASUREMENT INTEGRITY

(75) Inventors: Nicolas Martin, Bourg les Valence (FR); Bertrand Lesot, Valence (FR); Jacques Coatantiec, Fauconnieres (FR)

(73) Assignee: Thales (FR)

( * ) Notice: Subject to any disclaimer, the term of this patent is extended or adjusted under 35 U.S.C. 154(b) by 661 days.

(21) Appl. No.: 11/613,724

(22) Filed: Dec. 20, 2006

(65) Prior Publication Data

US 2007/0265810 A1 Nov. 15, 2007

(30) Foreign Application Priority Data

Dec. 20, 2005 (FR) .................................. 05 12992

(51) Int. Cl.
*G01S 5/02* (2006.01)
*G06F 19/00* (2006.01)

(52) U.S. Cl. ..................... 701/221; 701/220; 702/190

(58) Field of Classification Search ................. 701/221, 701/220, 207, 213; 702/190, 127, 191
See application file for complete search history.

(56) References Cited

U.S. PATENT DOCUMENTS

| | | | |
|---|---|---|---|
| 6,496,778 B1 * | 12/2002 | Lin | 701/215 |
| 6,588,117 B1 | 7/2003 | Martin et al. | |
| 6,859,170 B2 * | 2/2005 | Devereux et al. | 342/357.06 |
| 6,982,699 B1 | 1/2006 | Coatantiec et al. | |
| 7,409,289 B2 | 8/2008 | Coatantiec et al. | |
| 2002/0109628 A1 | 8/2002 | Diesel | |
| 2003/0149528 A1 * | 8/2003 | Lin | 701/214 |
| 2004/0267444 A1 | 12/2004 | Coatantiec et al. | |

FOREIGN PATENT DOCUMENTS

| | | |
|---|---|---|
| FR | 2 866 423 | 8/2005 |
| FR | 2 866 423 A1 | 8/2005 |
| FR | 2866423 A1 | 8/2005 |
| WO | 01/46712 A | 6/2001 |
| WO | 01/46712 A1 | 6/2001 |
| WO | 03/029755 A | 4/2003 |
| WO | 03/029755 A1 | 4/2003 |

* cited by examiner

*Primary Examiner*—Tan Q Nguyen
(74) *Attorney, Agent, or Firm*—Lowe Hauptman Ham & Berner, LLP (57) ABSTRACT

The invention relates to a closed loop hybridizing device comprising a Kalman filter bank, a virtual platform, a device to calculate pseudo-measurements estimated a priori. The Kalman filter bank comprises a principal Kalman filter adapted to the calculation of corrections to be applied to inertial measurements starting from all available pseudo-measurements, and n secondary Kalman filters adapted to the calculation of corrections to be applied to inertial measurements from a sub-set of available pseudo-measurements. The corrections originate from either the principal Kalman filter when no pseudo-measurement is erroneous or the secondary Kalman filter not affected by an erroneous pseudo-measurement. The corrections are applied simultaneously to inertial measurements and to the input to all other Kalman filters in the Kalman filter bank. In particular, the invention applies to a hybridizing device using information provided by an inertial unit and a satellite navigation system, for example a GPS system.

9 Claims, 4 Drawing Sheets

CLOSED LOOP HYBRIDISING DEVICE WITH MONITORING OF THE MEASUREMENT INTEGRITY

RELATED APPLICATIONS

The present application is based on, and claims priority from, France Application Number 05 12992, filed Dec. 20, 2005, the disclosure of which is hereby incorporated by reference herein in its entirety.

BACKGROUND OF THE INVENTION

The invention relates to a closed loop hybridising device. In particular, the invention applies to a hybridising device onboard a carrier using information provided by an inertial unit and a satellite navigation system, for example a GPS system.

Carriers such as aircraft or boats have a large number of navigation systems. These navigation means include particularly inertial units, radio-navigation systems using signals output by satellites, and these systems are known as Global Navigation Satellite Systems (G.N.S.S.), baro-altimeters and anemometers.

An inertial unit supplies information with little noise and precise in the short term. However in the long term, positioning performances of an inertial unit degrade more quickly as a function of the quality of sensors and processing used by the unit. Defects in sensors (accelerometers, gyrometers) used in the equipment are largely responsible for this degradation. Information acquired from a satellite navigation system is not very likely to drift in the long term. However, data transmitted by a satellite navigation system has a variable precision and often a great deal of noise In particularly, hybrid navigation systems use data from a satellite navigation system and an inertial unit and also output relative position and speed information to the carrier. The integrity of hybrid navigation systems is usually monitored using a Kalman filter bank in parallel. These filters hybridise information output by the satellite navigation system and the inertial unit. One of the filters of the bank of filters in parallel denoted as the principal filter, uses all GNSS measurements called pseudo-measurements and information available to it. The other so-called secondary filters of the bank of filters in parallel only use some of the available measurements and information. If a failure occurs at a satellite measurement, the filter that does not receive this measurement will not see it; therefore this filter will remain integral However, use of this architecture is problematic when it is required to make closed loop hybridising, in other words when it is required to apply corrections calculated by the Kalman filter directly to the inertial calculation device called the inertial unit virtual platform. The presence of a satellite failure then has a direct repercussion on the inertial measurements. The virtual platform is then "polluted" by erroneous corrections due to the use of measurements from a defective satellite to make the corrections. It is also possible to maintain one virtual platform for each Kalman filter, which requires a large number of calculations. However, this problem does not arise for an open loop hybridising in which no correction from the Kalman filter is applied directly onto the virtual platform. But in some cases, for example when the quality of the inertial sensors is not capable of maintaining the inertial errors modelled by the Kalman filter in a linear range, an architecture requiring closed loop hybridising is found to be indispensable.

SUMMARY OF THE INVENTION

In particular, the purpose of the invention is to overcome the above-mentioned disadvantages. Consequently, the purpose of the invention is a closed loop hybridising device comprising a Kalman filter bank, a virtual platform, a device to calculate pseudo-measurements estimated a priori. The device receives inertial increments and pseudo-measurements at its input, and outputs inertial measurements calculated by the virtual platform to which corrections are applied. The Kalman filter bank comprises:

a principal Kalman filter adapted to the calculation of corrections to be applied to inertial measurements starting from all available pseudo-measurements;

at least n secondary Kalman filters, where n is equal to the number of available pseudo-measurements, each secondary Kalman filter being adapted to the calculation of corrections to be applied to inertial measurements from a sub-set of available pseudo-measurements.

The corrections originate from:

either the principal Kalman filter when no pseudo-measurement is declared to be erroneous;

or the secondary Kalman filter not affected by an erroneous pseudo-measurement;

The corrections are applied simultaneously to inertial measurements and to the input to all other Kalman filters on the Kalman filter bank.

In one embodiment, a pseudo-measurement is declared to be erroneous when there is a secondary Kalman filter with corrections different from the corrections for the other secondary Kalman filters, said difference being greater than a fixed threshold. For example, a pseudo-measurement is declared to be erroneous when there is a secondary Kalman filter proposing corrections different from the corrections for the other secondary Kalman filters, said difference being identified by the maximum probability separation method.

In another embodiment, at time $t_n$, for an integer j between 1 and n, for an integer k between 1 and n, the state vector $X^j_{n/n}$ estimated by the $j^{th}$ Kalman filter comprising estimates of errors made on inertial measurements denoted $G_n$, the $k^{th}$ Kalman filter providing corrections to the virtual platform, the corrections being equal to $X^k_{n/n}$, the corrected inertial measurements at time $t_n$ are equal to the difference between the inertial measurements and the estimate $X^k_{n/n}$, the corrections also being transmitted at the same time to the other Kalman filters that adjust themselves by subtracting the $X^k_{n/n}$ estimate of the Kalman filter used to generate the corrections, from their estimate $X^j_{n/n}$.

At time $t_n$ with an integer k, the correction may be calculated by subtracting all corrections already applied between time $t_{n+1}$ and time $t_{n+k-1}$ from the estimate $X_{n/n}$ of the error. The pseudo-measurements can be calculated from corrected inertial measurements from which the estimate $X_{n/n-1}$ of the error is subtracted.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

In particular, the advantages of the invention are that it eliminates the duplication of inertial calculations that create extremely high processor loads, by avoiding the need to maintain the same number of inertial calculation devices and secondary hybridising filters.

Other specific features and advantages of the invention will become clearer after reading the following description with reference to the appended figures, wherein.

DETAILED DESCRIPTION OF THE DRAWINGS

Figure 1:
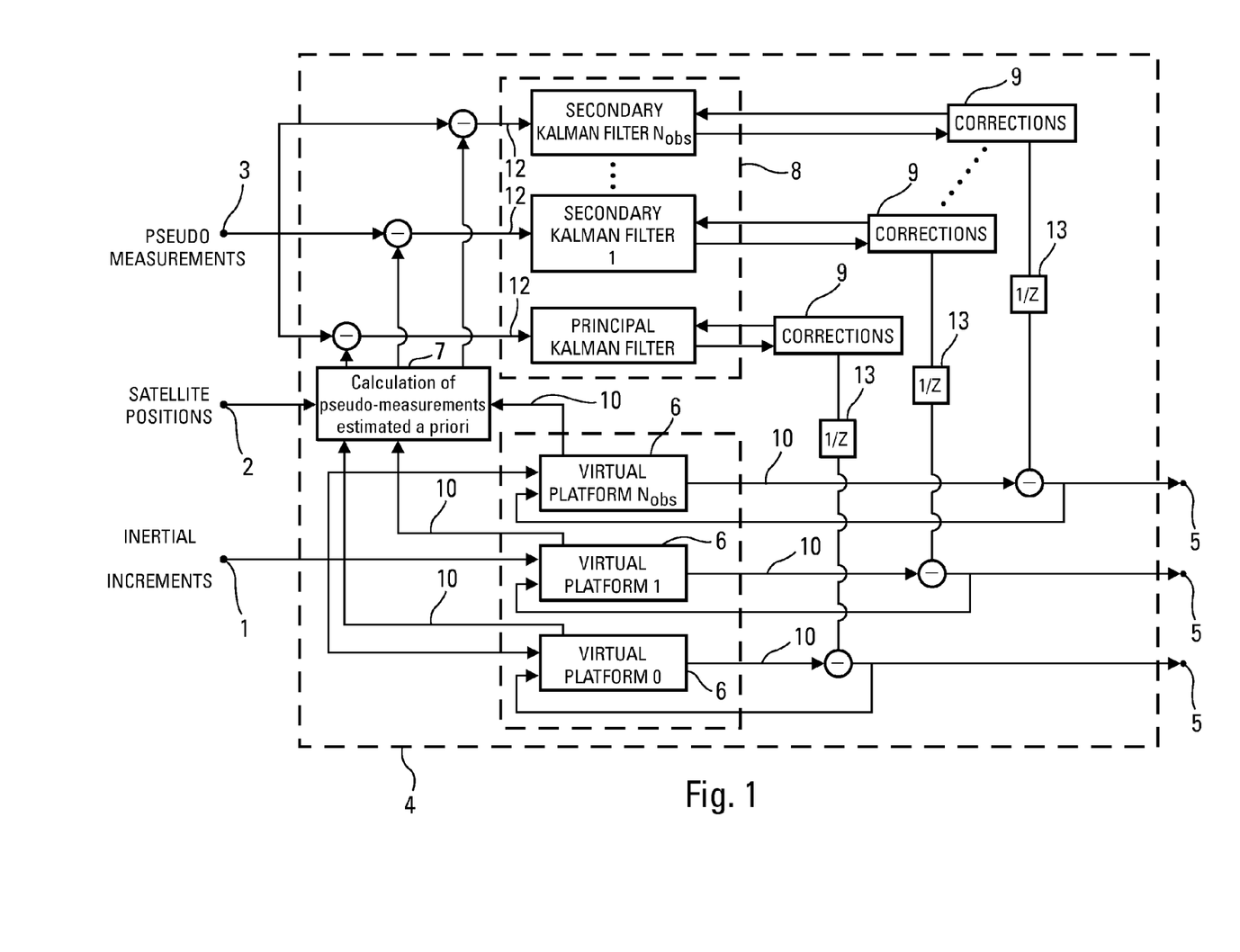
FIG. 1 is a closed loop hybridising device according to the state of the art.

FIG. 1 shows a closed loop hybridising device 4 according to the state of the art. In the example in FIG. 1, the closed loop hybridising device 4 uses information output by an inertial unit and by a satellite navigation system. An inertial unit comprises a set of gyrometric and accelerometric sensors associated with processing means. The closed loop hybridising device 4 receives inertial increments 1 output from sensors in the inertial unit. The inertial increments 1 correspond to velocity increments (accelerometric increments) and angular increments (gyrometric increments). Virtual platforms 6 calculate inertial navigation information 10 such as the orientation, velocity or position of the carrier in a given reference coordinate system, particularly from inertial increments 1. The angular and velocity increments are compensated, integrated, corrected and projected into the coordinate system in which inertial measurements are expressed, within virtual platforms 6. In the example of the closed loop hybridising device 4, these inertial measurements 10 are transmitted to a device that calculates pseudo-measurements estimated a priori 7. The device that calculates pseudo-measurements estimated a priori 7 also receives data about the position of satellites 2 making up the constellation of the satellite navigation system used. The device that calculates pseudo-measurements estimated a priori 7 uses firstly inertial measurements 10 and secondly data about the position of satellites 2, to calculate pseudo-measurements a priori 11 between the carrier and the different satellites in the constellation of the satellite navigation system used visible to the carrier. Furthermore, the closed loop hybridising device 4 receives the pseudo-measurements 3 between the carrier and the different visible satellites in the constellation of the navigation system used, from this satellite navigation system used. The differences called observations 12 between the pseudo-measurements estimated a priori 7 and the pseudo-measurements 3 can then be calculated. In order to check the integrity of measurements made by the satellite navigation system, the closed loop hybridising device 4 also comprises a Kalman filter bank 8 receiving all or some of the observations 12. The Kalman filter bank 8 comprises several Kalman filters in parallel. A Kalman filter is associated with each virtual platform 6. Also, when the closed loop hybridising device 4 comprises $N_{Obs}+1$ virtual platforms 6, the Kalman filter bank 8 comprises $N_{Obs}+1$ Kalman filters. One of the filters in the Kalman filter bank 8 is called the principal filter; it receives all pseudo-measurements. The other Kalman filters in the Kalman filter bank 8 are called secondary filters; they only receive some of the available pseudo-measurements, in other words a sub-set of available pseudo-measurements. The principal Kalman filter and the secondary Kalman filters are Kalman filters operating with observations 12. These filters hybridise inertial information output from the inertial unit and information from the satellite navigation system. The role of the Kalman filters is to keep the virtual platform 6 to which they are attached within a linear operating range that is the image of that modelled in the Kalman filter by calculating corrections 9. The corrections 9 are thus applied to the inertial measurements 10 of the inertial calculation device 6 (closed loop hybridising) with a delay 13 (the input correction is the delayed output, particularly related to the calculation time). The closed loop hybridising device 4 provides inertial measurements 10 at the output 5 to which the corrections 9 were applied in the virtual platform 6. These outputs are called hybrid outputs and comprise velocity, position and orientation information about the carrier. This information is stable and not very noisy, and represents the best estimated navigation information according to the least squares criterion.

The following contains a reminder of the general principle of Kalman filtering:

Kalman filtering uses a state model established based on known or assumed knowledge of the behaviour of physical magnitudes related to the unknowns that are to be found, and particularly the orientation, velocity and position of the receiver and available measurements, in fact the code and carrier pseudo-distances and pseudo-velocities, all this information being included under the term pseudo-measurements. The state model consists of:

a state vector $X_n$ representing the physical magnitudes modelled at time $t_n$, comprising a number of components $N_{state}$ that is a priori unrelated to the number of satellite pseudo-measurements received $N_{obs}$. $X_n$ contains all parameters that the filter is attempting to estimate.

a propagation model, in the following form:

$$X_{n+1}=F_n X_n+V_n$$

where:

$X_{n+1}$ is the state vector at time $t_{n+1}$ $F_n$ is the propagation matrix on the interval $[t_n, t_{n+1}]$, with dimension $[N_{state};N_{state}]$. This matrix translates the variation of the state vector between the two update instants $t_n$ and $t_{n+1}$.

$V_n$ is the model noise vector on $[t_n, t_{n+1}]$. This noise is assumed to be white, Gaussian with zero average. The model noise matrix $Q_n=E[V_n V_n^T]$ is associated with it (where $V_n^T$ is the transpose vector of $V_n$) and with dimension $[N_{state};N_{state}]$.

an observation model in the following form:

$$Z_n=H_n X_n+W_n$$

where:

$Z_n$ is the observation vector at time $t_n$, with dimension $N_{obs}$. This vector contains all measurements related to the system.

$H_n$ is the observation matrix at time $t_n$, with dimension [$N_{obs}$; $N_{state}$]

$W_n$ is the measurement noise vector at time $t_n$. This noise is assumed to be white, gaussian with zero average. The measurement noise matrix $R_n=E[W_n \cdot W_n^T]$ is associated with it (where $W_n^T$ is the transpose vector of $W_n$) with dimension [$N_{obs}$; $N_{obs}$].

In this state model, the state vector $X_n$ comprises all parameters that are to be estimated through the observation vector. The observation is made using the observation model.

The Kalman filter predicts the state vector $X_n$ by a propagation calculation, using the propagation model and then estimates the state vector $X_n$ by an updated calculation starting from observations and the observation model.

The filter does this in two steps with the state vector (prediction and supply of information a priori, update and supply of information a posteriori):

the state vector estimated at time $t_n$ is denoted $X_{n/n}$ after updating at time $t_n$, the propagated state vector is denoted $X_{n+1/n}$ after propagation between times $t_n$ and $t_{n+1}$. The process is then reiterated, the state vector estimated at time $t_{n+1}$ is denoted $X_{n+1/n+1}$ after updating at time $t_{n+1}$, and so on. The dimension of vector $X_{n/n}$ is $N_{state}$.

the covariance matrix of the estimated state $X_{n/n}$ at time $t_n$ is denoted $P_{n/n}$ after the update at time $t_n$, the covariance matrix of the propagated state $X_{n+1/n}$ is denoted $P_{n+1/n}$ after propagation between times $t_n$ and $t_{n+1}$. The dimension of the state vector covariance matrix is [$N_{state}$; $N_{state}$].

The filter uses the following formulas to make the propagation calculation:

For the estimated state vector:

$$X_{n+1/n}=F_n X_{n/n}$$

For the covariance matrix:

$$P_{n+1/n}=F_n P_{n/n} F_n^T + Q_n$$

(where $F_n^T$ is the transpose matrix of $F_n$)

The filter uses the following formulas for the update calculation: For the update gain:

$$K_{n+1}=P_{n+1/n} H_{n+1}^T \cdot (H_{n+1} P_{n+1/n} H_{n+1}^T + R_{n+1})$$

(where $H_{n+1}^T$ is the transpose matrix of $H_{n+1}$)

For the estimated state vector:

$$X_{n+1/n+1}=X_{n+1/n}+K_{n+1} \cdot (Z_{n+1}-H_{n+1} X_{n+1/n})$$

For the covariance matrix:

$$P_{n+1/n+1}=(Id_{Nstate}-K_{n+1} H_{n+1}) \cdot P_{n+1/n}$$

(where $Id_{Nstate}$ is the identity matrix with size [$N_{state}$; $N_{state}$])

Initially, the state vector $X_0$ is initialised to zero and the matrix $P_0$ is initialised with the variances and covariances representative of the uncertainty on the physical magnitudes modelled on the state vector.

The propagation calculation uses matrices $F_n$ and $Q_n$ to determine the propagated a priori state vector $X_{n+1/n}$ starting from the updated a posteriori estimated vector $X_{n/n}$, and the propagated covariance matrix $P_{n+1/n}$ starting from the updated covariance matrix $P_{n/n}$.

The update calculation uses the observations $Z_{n+1}$ output from receiver measurements and matrices $H_{n+1}$ and $R_{n+1}$, to determine the updated a posteriori state vector $X_{n+1/n+1}$ starting from the propagated a priori state vector $X_{n+1/n}$ and the updated covariance matrix $P_{n+1/n+1}$ starting from the propagated covariance matrix $P_{n+1/n}$.

n is then incremented by 1 (namely n=n+1), and the propagation operation is restarted and followed by the update operation, and so on.

Physical Interpretation of the Kalman Filter:

The coefficients of the covariance matrix $P_n$ represent firstly the variance of each of the components of the estimated state vector (diagonal terms) and secondly the covariance of the different pairs of components of this vector (non-diagonal terms). The matrix $P_n$ represents the degree of confidence assigned to the estimate of the different elements of the state vector and the degree of correlation between the different states.

The propagation matrix $F_n$ sets up the relation between the state vector before propagation and after propagation.

The model noise covariance matrix $Q_n$ is used to quantify approximations made in the propagation model for each component of the state vector $X_{n/n}$.

The observations matrix $H_n$ sets up the relation between the state vector and the measurements.

The covariance matrix $R_n$ of measurement noise characterises the specific noise of measurements, in other words the degree of confidence on the information included in the observation during the update of the Kalman filter.

In particular, the purpose of the Kalman filters is to model and update corrections to be made to inertial measurements 10 using the state vector, in other words to estimate navigation errors within the virtual platform 6. When a number $N_{obs}$ of satellites is visible to the carrier, the principal Kalman filter receives $N_{obs}$ pseudo-measurements grouped within observations 12. The $N_{obs}$ secondary Kalman filters calculate corrections using ($N_{obs}-1$) satellite pseudo-measurements among the $N_{obs}$ observations 12. In the case of closed loop hybridising according to the state of the art, each Kalman filter produces corrections 9 that are then applied to inertial measurements 10 calculated by the inertial calculation device 6. Thus, each Kalman filter is associated with a virtual platform 6. The corrections 9 modelled in the Kalman filter state vectors make it possible to remain within the linear range of each virtual platform 6 consistent with variation of the navigation system. In the case of hybridising complying with the state of the art, secondary Kalman filters are independent of each other and are independent of the principal filter.

In the case shown in FIG. 1, in other words when it is required to make closed loop hybridising, in other words when it is required to apply the corrections calculated by the Kalman filter 8 at the inertial platform 6, the corrections output from the Kalman filter are applied directly onto the inertial calculation device 6. In the long term, navigation errors of an inertial unit will drift, particularly under the influence of defects in the sensors from which it is made. Therefore the closed loop structure is necessary when the quality of inertial sensors makes it impossible to maintain inertial measurements with an error remaining within the linear range of the error model used by Kalman filters on the Kalman filter bank 8 during the time interval under consideration. With closed loop hybridising, the presence of a satellite failure among the satellite observations used by the Kalman filter has a direct repercussion on the inertial measurements 10 of the inertial calculation device 6, unless one virtual platform 6 is kept for each secondary Kalman filter. This would require that inertial calculations be spread within several inertial calculation devices 6. In this case, the Kalman filter that does not use the incorrect measurement does not disturb its virtual platform, and the output data remain integral.

Figure 2:
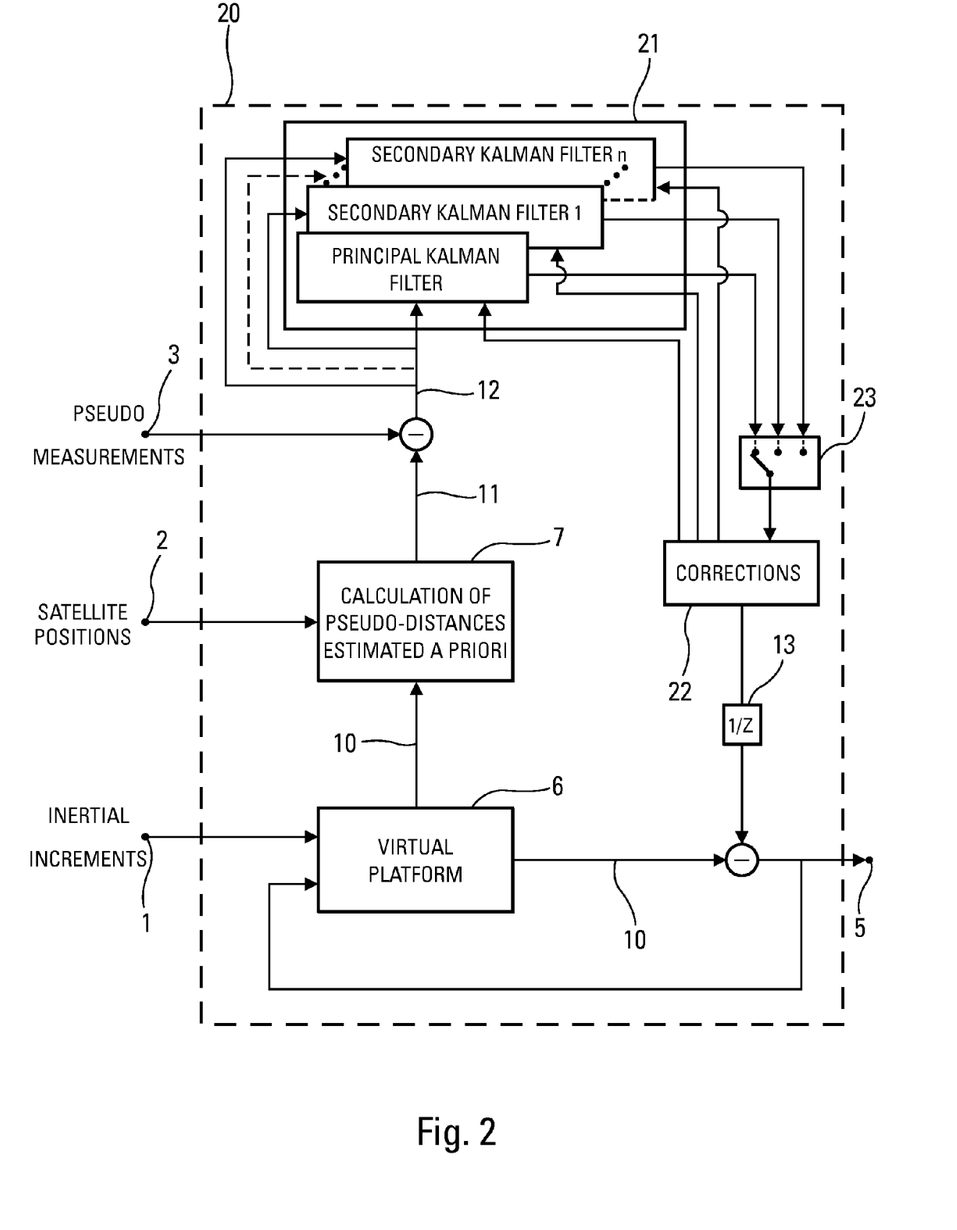
FIG. 2 is a closed loop hybridising device according to the invention

FIG. 2 shows a closed loop hybridising device 20 according to the invention. Elements identical to elements already presented in FIG. 1 are marked with the same references. The closed loop hybridising device according to the invention reuses the principle of the closed loop hybridising device 4 according to the state of the art, in other words based on the principle of closed loop hybridising comprising a Kalman filter bank 8. The closed loop hybridising device 20 according to the invention also comprises a single virtual platform 6, a calculation device for pseudo-measurements estimated a priori 7. The closed loop hybridising device 20 according to the invention receives inertial increments 1, data about the position of satellites 2 and pseudo-measurements 3, as input. At the output 5, the closed loop hybridising device 20 according to the invention outputs hybrid navigation information including inertial measurements 10 to which the corrections 22 have been applied. The closed loop hybridising device 20 according to the invention comprises a Kalman filter bank 21. The Kalman filter bank 21 comprises a principal Kalman filter and secondary Kalman filters identified using an index varying from 1 to n, where n is an integer equal to the number of measurements in the satellite navigation system. Unlike the Kalman filter bank 4 according to the state of the art, the Kalman filter bank 21 enables:

calculation of the corrections 22 to be applied to the inertial measurements 10, the corrections 22 being output from one of the Kalman filters and simultaneously applying these corrections 22 not only to the inertial measurements 10 but also to the input of all other Kalman filters in the Kalman filter bank 21 that do not correct the inertial measurements 10.

A selection device 23 receives corrections calculated by all Kalman filters at the input, and outputs corrections to the chosen Kalman filter. The selection device 23 chooses the principal Kalman filter when no failure is detected in one of the satellites in the observations 12. When a failure is detected in one of the satellites, the selection device 23 is the secondary Kalman filter not affected by said failure. Therefore, the corrections 22 originate from a single Kalman filter. The other Kalman filters then operate consistently with the Kalman filter outputting the corrections 22. This technique isolates a satellite that sends erroneous data. The $k^{th}$ secondary Kalman filter receives pseudo-measurements from all satellites except from the $k^{th}$ satellite. Thus, if the $k^{th}$ satellite sends erroneous information, the $k^{th}$ secondary Kalman filter does not receive corrupted information and is not disturbed. Unlike the principal Kalman filter that received the erroneous measurement and therefore would apply an erroneous correction to the inertial measurements 10 if it were used to correct the virtual platform. The corrections 22 of the Kalman filter used are also sent to the other Kalman filters, so as to keep the Kalman filters for which corrections are not applied to the virtual platform coherent with the virtual platform. The corrections 22 sent by the Kalman filter correcting the virtual platform to the other Kalman filters are seen as controls acting on the states of each of the Kalman filters. The behaviour of the secondary Kalman filter that does not receive the measurement from the corrupted satellite is very different from the behaviour of the other secondary Kalman filters and the defective satellite can be detected by comparison with a threshold. Thus, a pseudo-measurement is declared to be erroneous when there is a secondary Kalman filter proposing different corrections from the other secondary Kalman filters, said difference being greater than a fixed threshold. For example, the maximum likelihood separation method can be used. Thus, the virtual platform can be corrected with a non-polluted filter. If the Kalman filter that produces the corrections is found to be contaminated by a false measurement, the Kalman filter that produces the corrections is replaced by choosing the Kalman filter considered to be integral after isolation of the failure that occurred.

Figure 3:
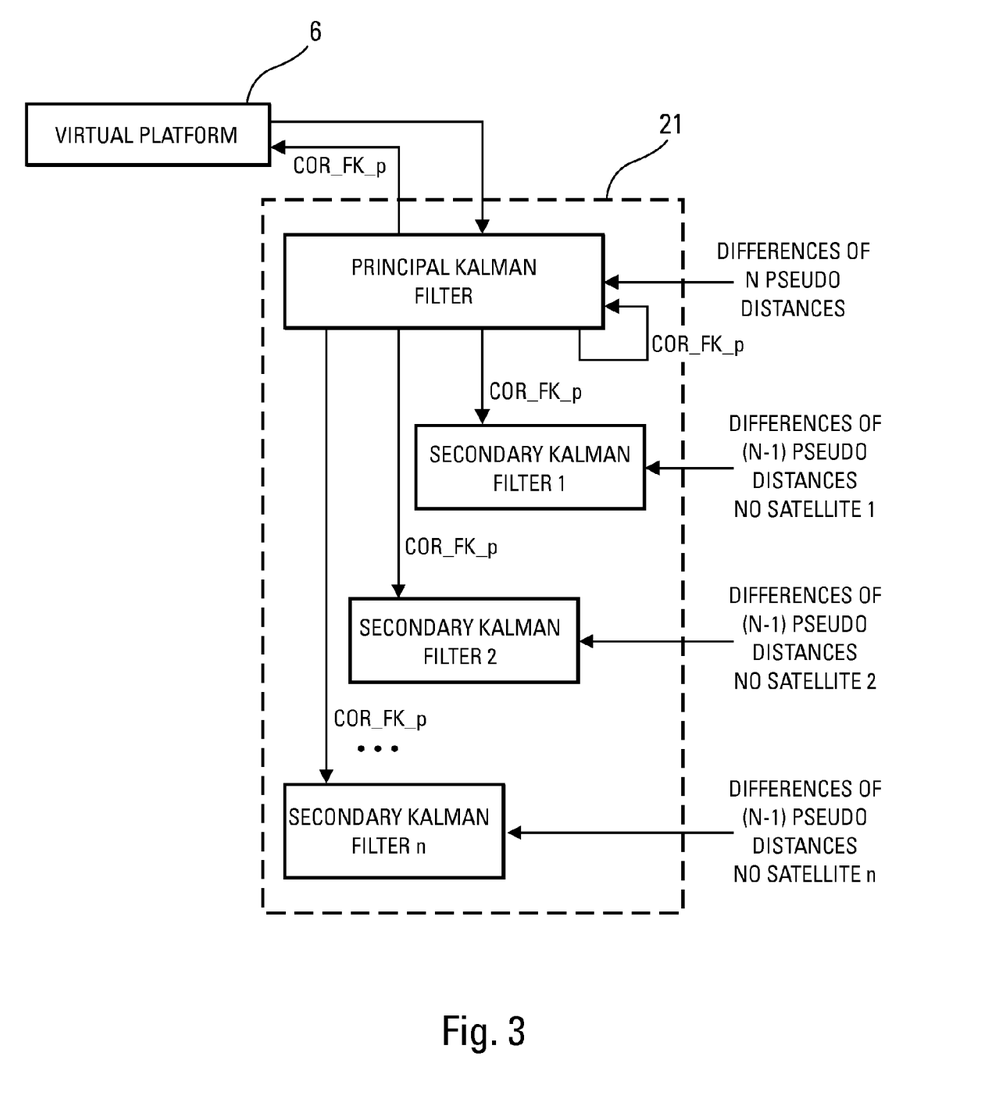
FIG. 3 shows the transmission of corrections calculated by the Kalman filter used to correct the virtual platform to the virtual platform and to other Kalman filters in closed loop hybridising according to the invention.

FIG. 3 shows how corrections calculated by the Kalman filter used to correct the virtual platform are sent to the virtual platform and to other Kalman filters in a closed loop hybridising 20 according to the invention. FIG. 3 shows a case in which no satellite failure is detected. In this case, the principal Kalman filter that receives all satellite pseudo-measurements also controls the virtual platform 6 and communicates its corrections to the other Kalman filters, that in this case are the secondary Kalman filters. Elements identical to elements already presented in the previous figures are marked with the same references. The Kalman filter correcting the virtual platform 6 receives the n pseudo-measurements included among the observations 12, and calculates the corrections 22 to be applied to the inertial measurements 10. To do this, the Kalman filter generates correction data COR_FK_p. These correction data are transmitted to be used as corrections 22 applicable to inertial measurements 10. These correction data COR_FK_p are also transmitted simultaneously to the other Kalman filters that then operate consistently with respect to the Kalman filter correcting the virtual platform 6. Remember that the $k^{th}$ secondary Kalman filter receives pseudo-measurements originating from all satellites except for the $k^{th}$ satellite.

At time $t_n$, the state vector estimated by the $j^{th}$ Kalman filter is denoted $X^j_{n/n}$. This vector comprises estimates of errors made on the inertial measurements 10, denoted $G_n$. If the inertial measurements $G_n$ are modified at time $t_n$ by a known quantity q, the estimate $X^j_{n/n}$ must be modified by the same quantity q. Also, if it is assumed that the $k^{th}$ Kalman filter outputs corrections 22 to the virtual platform at time $t_n$, the corrections 22 are equal to $X^k_{n/n}$. Therefore at time $t_n$, the corrected inertial measurements $G_n$ are equal to the difference between the inertial measurements $G_n$ and the estimate $X^k_{n/n}$. Since the corrections 22 are also transmitted to Kalman filters at the same time, the Kalman filters adjust themselves by subtracting the estimate $X^k_{n/n}$ of the Kalman filter used to generate the corrections 22, from their estimate $X^j_{n/n}$. When a failure is detected and identified, which is a case not shown in FIG. 3, the principal Kalman filter will no longer be used and instead the secondary Kalman filter that remained integral (in other words, the filter that does not observe the corrupted satellite measurement) corrects the virtual platform 6 and sends its corrections 22 to the other Kalman filters, in other words the principal Kalman filter and the N−1 remaining secondary Kalman filters that observe the defective satellite.

Figure 4A:
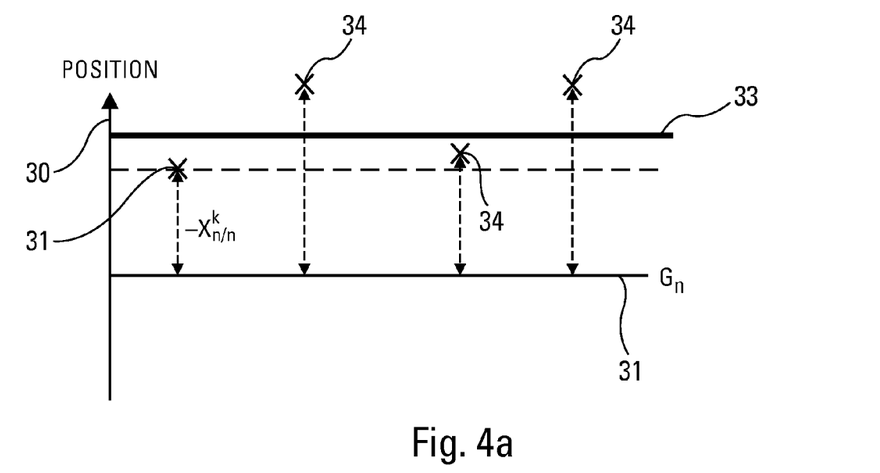
FIG. 4a shows corrections proposed by each Kalman filter in the Kalman filter bank before applying the correction from one of the Kalman filters on the inertial measurements.
Figure 4B:
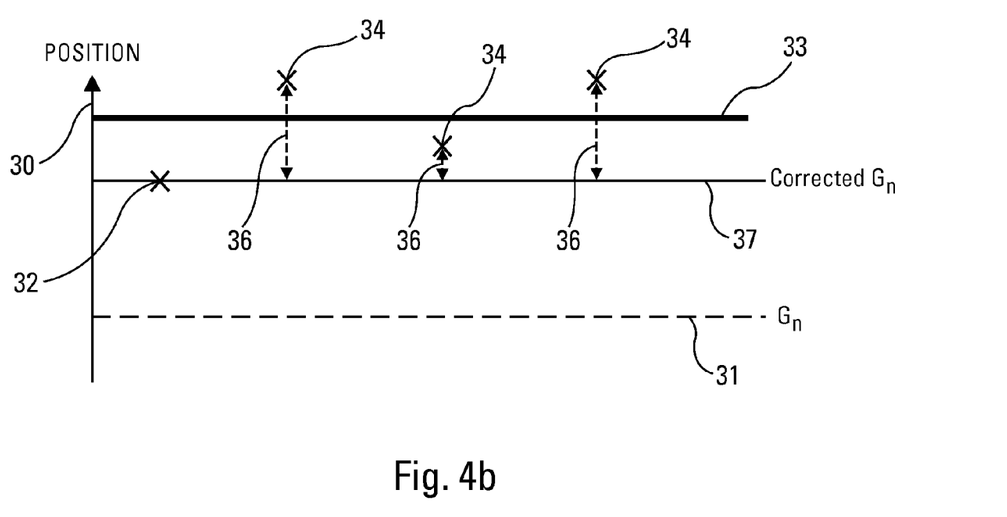
FIG. 4b shows corrections proposed by each Kalman filter in the Kalman filter bank after the corrections output from the $k^{th}$ Kalman filter have been applied to the inertial measurements.

FIG. 4*a* shows a diagram illustrating corrections proposed by each Kalman filter in the Kalman filter bank before application of the correction from one of the Kalman filters on the inertial measurements. FIG. 4*b* is a diagram illustrating corrections proposed by each Kalman filter in the Kalman filter bank after application of corrections output from the $k^{th}$ Kalman filter on the inertial measurements. In FIG. 4*a*, the diagram shown at a given instant comprises an ordinate axis 30 representing a position. The straight line 31 represents the inertial measurements $G_n$ as calculated by the virtual platform before application of corrections 22. The point 32 represents the deduced position of the estimate $X^k_{n/n}$ of the error by the Kalman filter used for correction of the virtual platform (PFV). Points 34 represent positions of estimates $X^j_{n/n}$ deduced by the error by other Kalman filters. The straight line 33 represents the real unknown position of the carrier to be estimated through hybrid outputs. After application of corrections 22, the corrected inertial measurements 10 will be equal to the inertial measurements $G_n$ minus the estimate $X^k_{n/n}$ of the error of the Kalman filter correcting the PFV. In FIG. 4b, the diagram shown at a given instant after application of the corrections 22, comprises an ordinate axis 30 representing a position. The straight line 31 represents inertial measurements $G_n$ as calculated by the inertial measurement calculation device 6 before application of corrections 22. The point 32 represents the deduced position of the estimate $X^k_{n/n}$ of the error of the Kalman filter used. The straight line 37 represents corrected inertial measurements 10. Estimates $X^j_{n/n}$ of the error of the other Kalman filters are no longer calculated with respect to the straight line 31, but rather with respect to the straight line 37. It can be seen in FIG. 4b that application of the correction simultaneously to the updated state vectors $X^j_{n+1/n+1}$ of Kalman filters not used to control the virtual platform and to the corrected inertial measurements 10 does not change the positions calculated from the estimates $X^j_{n/n}$.

Corrections 22 may be applied with a delay, particularly due to a non-zero calculation time for these corrections. The corrections 22 may then be calculated from prior observations 12. Furthermore, the application time 22 of the corrections may also be controlled so as to wait for confirmation that the inertial measurements 10 made are valid. The term << Time To Alarm >> is used to describe this case. This is done by applying the corrections 22 to the inertial measurements 10 and to all Kalman filters in the Kalman filter bank 21 at the same time but with a certain delay. It is thus possible to make sure that corrections 22 corresponding to the difference between the inertial position and the true position, remain within the linear range of the error propagation model.

In one particular embodiment, particularly to avoid overcompensating errors in the inertial measurements 10 and therefore generating oscillations on state vectors estimated in Kalman filters, it is possible to anticipate calculated corrections between time $t_n$ and time $t_{n+k-1}$ (where k is an integer) and apply them to the inertial measurements 10 at time $t_{n+k}$, at a time $t_n$. This can be done by calculating the correction at time $t_n$ by subtracting all corrections already applied between time $t_{n+1}$ and time $t_{n+k-1}$, from the estimate $X_{n/n}$ of the error.

In one embodiment, the calculation of the observations 12 used to update the different filters may also be made using hybrid positions, instead of inertial information at the output from the inertial platform, so as to observe smaller differences. In this case, the propagated inertial position $G_n$ is used to calculate the pseudo-measurements, by subtracting the error estimate $X_{n/n-1}$.

The description uses an example to describe the invention consisting of a device using information output by an inertial unit and by a satellite navigation system. Obviously, the hybridising device according to the invention is not applicable to satellite measurements alone, but also to any independent measurement sources for which coherence has to be monitored. For example, the hybridising device according to the invention may be used for a satellite positioning system (with no inertial unit).

Furthermore, the number of principal and secondary Kalman filters described and presented in the figures is not limitative. The invention may be used as a function of needs with a variable number of filters. It is thus possible to make a device according to the invention comprising a number $n*(n-1)/2$ of filters, each receiving $(n-2)$ pseudo-measurements.

The device according to the invention uses Kalman filters. However, it is possible to replace these Kalman filters by other types of filter, particularly performing observation, prediction and propagation functions.

The functions of the device according to the invention may be used by one or several computers, for example such as a flight management computer in the case of an aircraft.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A closed loop hybridising device, comprising:
 a Kalman filter bank,
 a virtual platform,
 a calculating device to calculate pseudo-measurements estimated a priori, said calculating device receiving inertial increments and pseudo-measurements at its input, and outputting inertial measurements calculated by the virtual platform to which corrections are applied on its output,
 wherein said Kalman filter bank comprises:
  a principal Kalman filter adapted to the calculation of corrections to be applied to inertial measurements starting from all available pseudo-measurements;
  at least n secondary Kalman filters, where n is equal to the number of available pseudo-measurements, each secondary Kalman filter being adapted to the calculation of corrections to be applied to inertial measurements from a sub-set of available pseudo-measurements; the corrections originating from:
   either the principal Kalman filter when no pseudo-measurement is declared to be erroneous; or
   the secondary Kalman filter not affected by an erroneous pseudo-measurement;
  said corrections being applied simultaneously to inertial measurements and to the input to all other Kalman filters in the Kalman filter bank.

2. The device set forth in claim 1, wherein a pseudo-measurement is declared to be erroneous when there is a secondary Kalman filter with corrections different from the corrections for the other secondary Kalman filters, said difference being greater than a fixed threshold.

3. The device set forth in claim 2, wherein a pseudo-measurement is declared to be erroneous when there is a secondary Kalman filter proposing corrections different from the corrections for the other secondary Kalman filters, said difference being identified by the maximum probability separation method.

4. The device set forth in claim 3, wherein at time $t_n$, for an integer j between 1 and n, for an integer k between 1 and n, the state vector $X^j_{n/n}$ estimated by the $j^{th}$ Kalman filter comprising estimates of errors made on inertial measurements denoted $G_n$, the $k^{th}$ Kalman filter providing corrections to the virtual platform, the corrections being equal to $X^k_{n/n}$, the corrected inertial measurements at time $t_n$ are equal to the difference between the inertial measurements and the estimate $X^k_{n/n}$, the corrections also being transmitted at the same time to the other Kalman filters that adjust themselves by subtracting the $X^k_{n/n}$ estimate of the Kalman filter used to generate the corrections, from their estimate $X^j_{n/n}$.

5. The device set forth in claim 2, wherein at time $t_n$, for an integer j between 1 and n, for an integer k between 1 and n, the state vector $X^j_{n/n}$ estimated by the $j^{th}$ Kalman filter comprising estimates of errors made on inertial measurements denoted $G_n$, the $k^{th}$ Kalman filter providing corrections to the virtual platform, the corrections being equal to $X^k_{n/n}$, the corrected inertial measurements at time $t_n$ are equal to the difference between the inertial measurements and the estimate $X^k_{n/n}$, the corrections also being transmitted at the same time to the other Kalman filters that adjust themselves by subtracting the $X^k_{n/n}$ estimate of the Kalman filter used to generate the corrections, from their estimate $X^j_{n/n}$.

6. The device set forth in claim 1, wherein at time $t_n$, for an integer j between 1 and n, for an integer k between 1 and n, the state vector $X^j_{n/n}$ estimated by the $j^{th}$ Kalman filter comprising estimates of errors made on inertial measurements denoted $G_n$, the $k^{th}$ Kalman filter providing corrections to the virtual platform, the corrections being equal to $X^k_{n/n}$, the corrected inertial measurements at time $t_n$ are equal to the difference between the inertial measurements and the estimate $X^k_{n/n}$, the corrections also being transmitted at the same time to the other Kalman filters that adjust themselves by subtracting the $X^k_{n/n}$ estimate of the Kalman filter used to generate the corrections, from their estimate $X^j_{n/n}$.

7. The device set forth in claim 6, wherein at time $t_n$ with an integer k, the correction is calculated by subtracting all corrections already applied between time $t_{n+1}$ and time $t_{n+k-1}$ from the estimate $X_{n/n}$ of the error.

8. The device set forth in claim 7, wherein the pseudo-measurements are calculated from the corrected inertial measurements from which the estimate $X_{n/n-1}$ of the error is subtracted.

9. The device set forth in claim 6, wherein the pseudo-measurements are calculated from the corrected inertial measurements from which the estimate $X_{n/n-1}$ of the error is subtracted.

* * * * *